(12) United States Patent
Kohli

(10) Patent No.: US 7,299,657 B2
(45) Date of Patent: Nov. 27, 2007

(54) METHOD OF MAKING HIGH STRAIN POINT GLASS

(75) Inventor: Jeffrey T. Kohli, Corning, NY (US)

(73) Assignee: Corning Incorporated, Corning, NY (US)

( * ) Notice: Subject to any disclaimer, the term of this patent is extended or adjusted under 35 U.S.C. 154(b) by 451 days.

(21) Appl. No.: 10/194,504

(22) Filed: Jul. 12, 2002

(65) Prior Publication Data
US 2004/0007019 A1    Jan. 15, 2004

(51) Int. Cl.
*C03B 19/06* (2006.01)
*C03C 3/00* (2006.01)

(52) U.S. Cl. .......................... 65/17.6; 65/106; 65/126; 65/325; 65/413

(58) Field of Classification Search ................. 65/17.6, 65/17.4, 54, 85, 96, 106, 144, 184, 182.2, 65/25.1, 126, 187, 325, 413
See application file for complete search history.

(56) References Cited

U.S. PATENT DOCUMENTS

| | | | | |
|---|---|---|---|---|
| 3,914,118 A | * | 10/1975 | Brooke et al. ................. 65/95 |
| 4,354,866 A | * | 10/1982 | Mouly ........................ 65/99.5 |
| 5,798,142 A | * | 8/1998 | Soubeyrand ........... 427/255.18 |
| 6,024,084 A | * | 2/2000 | Gerhardinger ............... 126/200 |
| 6,245,396 B1 | * | 6/2001 | Nogami ...................... 427/562 |
| 6,413,579 B1 | * | 7/2002 | Nelson et al. .............. 427/166 |
| 6,446,467 B1 | * | 9/2002 | Lieberman et al. .......... 65/17.2 |
| 6,763,682 B1 | * | 7/2004 | Sayce et al. ................. 65/17.4 |
| 6,772,610 B1 | * | 8/2004 | Albrand et al. ............... 65/162 |

FOREIGN PATENT DOCUMENTS

WO    WO 003955 A1  *  1/2000
WO    WO 0114270 A1  *  3/2005

* cited by examiner

*Primary Examiner*—Carlos Lopez
(74) *Attorney, Agent, or Firm*—Christopher Nicastri; Sirven Chen; Adenike Adebiyi

(57) ABSTRACT

A method of forming a glass sheet includes obtaining a preform generated from a glass composition and conveying the preform through a channel having a temperature that decreases along a length of the channel to form a glass sheet having a predetermined width and thickness.

15 Claims, 14 Drawing Sheets

METHOD OF MAKING HIGH STRAIN POINT GLASS

BACKGROUND OF INVENTION

1. Field of the Invention

The invention relates generally to flat display panels. More specifically, the invention relates to a method and an apparatus for making glass sheet.

2. Background Art

There is a surge of interest in glasses having a high strain point in the display industry. These glasses are needed to make flat display panels for the next-generation liquid crystal displays (LCDs), e.g., active matrix LCDs (AMLCDs), and other advanced displays, e.g., plasma displays. Generally speaking, a strain point of at least 700° C. is desired. Preferably, the strain point is greater than 800° C. In the case of AMLCDs, the need for such a high strain point is dictated by the interest in bonding silicon chips or arrays directly onto glass substrates. Fabrication of poly-silicon on glass substrates is further facilitated by process temperatures of 900° C. or greater. In order to accomplish this objective, it is necessary for the thermal expansion behavior of the glass to be very similar to that of silicon, and for the strain point of the glass to be high enough so that compaction (also known as shrinkage or densification) and/or warping of the glass does not occur after the silicon chips are bonded to the glass and the glass is subsequently heated in further processing steps.

The two methods commonly used in manufacturing LCD substrates are the float process and the fusion process. Both of these processes require a refractory glass melter to deliver a stream of glass to a sheet-forming device. In the case of high strain-point glass compositions, a relatively large high-temperature glass melter is needed to deliver a high-quality stream of glass to the sheet-forming device. This is because high strain-point glasses have high fusion temperatures, typically in excess of 1700° C.

In the float process, a stream of molten glass is discharged from a melting furnace into a float furnace that contains a liquid metal medium. Typically, the metal is tin. The atmosphere in the float furnace is controlled to prevent oxidation of the tin. The molten glass floats and spreads out on the liquid tin in the form of a flat, continuous ribbon. The ribbon of glass is conveyed into an annealing lehr or cooling tunnel, where it is cooled at a controlled rate to ambient temperature. The cooled glass has a flat, smooth surface that requires a minimum of further finishing by processes such as grinding and polishing.

However, it is very difficult to form glasses having high strain points in an enclosure containing molten tin. This is because tin has high vapor pressures at temperatures in excess of 1050 to 1100° C. At the high forming temperatures required for high strain-point glasses, the molten tin will vaporize inside the float furnace and subsequently condense in colder parts of the furnace. In some cases, the condensation may be sufficiently high to create what is referred to as "tin rain," a situation where tin rains on the glass and is incorporated on the glass surface.

In the fusion process, a glass-forming melt flows into a refractory trough and then overflows in a controlled manner from either side of the trough. A key advantage of this process is that the surface of the glass sheet, which is ultimately formed, does not come in contact with any refractory material or other forming equipment. Another benefit of the process is that it yields a very flat and uniformly thick sheet of glass. As a result, no secondary processing is needed to obtain a smooth, flat, and uniform sheet of glass for display applications. The fusion process requires glasses exhibiting a relatively high viscosity at the liquidus temperature. Typically, it is desirable to form the glass at viscosities in the range of $10^5$ to $10^6$ poise to obtain optimum flatness and uniform thickness.

A brief description of both the fusion draw and float processes are given in a manuscript entitled "Glass" by D. C. Boyd and D. A. Thompson, Encyclopedia of Chemical Technology, Vol. 11, Third Edition, pp. 807-880 (see pages 860-863). The fusion draw process is also described in U.S. Pat. Nos. 3,338,696 and 3,682,609, both issued to Dockerty. Unfortunately, neither the fusion draw process nor the float glass process is effective in producing flat sheet from a glass composition whose strain point exceeds 900° C.

SUMMARY OF INVENTION

In one aspect, the invention relates to a method of forming a glass sheet which comprises obtaining a preform generated from a glass composition and conveying the preform through a channel having a temperature that decreases along a length of the channel to form a glass sheet having a predetermined width and thickness. In some embodiments, the method includes consolidating the preform prior to and/or while forming the preform into a glass sheet.

In another aspect, the invention relates to a method of forming a glass sheet which comprises generating a first and a second preform, combining the first and the second preforms into a single unit, and drawing the single unit into a glass sheet having desired dimensions and flatness.

In another aspect, the invention relates to a method of forming a glass sheet which comprises feeding a plurality of preforms into a channel in a serial manner, fusing adjacent edges of the preforms together in a hot zone in the channel, and forming a continuous glass sheet having desired dimensions and flatness by conveying the fused preforms through a series of heated zones in the channel which become progressively cooler.

In another aspect, the invention relates to an apparatus for forming a glass sheet which comprises a deposition zone where soot is generated and deposited on a deposition substrate to form a preform and a forming zone where the preform is formed into a glass sheet having desired dimensions and flatness.

In another aspect, the invention relates to an apparatus for forming a glass sheet which comprises a conveyor system having a deposition substrate, a deposition zone where soot is generated and deposited on the deposition substrate to form a preform, and a forming zone where the preform is drawn into a glass sheet having desired dimensions and flatness.

In another aspect, the invention relates to an apparatus for forming a glass sheet which comprises a conveyor system having a refractory substrate, a deposition zone where soot is generated and deposited on the refractory substrate to form a preform, a transition zone where the preform transitions from a non-vertical orientation to a vertical orientation, and a forming zone where the preform is drawn into a glass sheet having desired dimensions and flatness.

In another aspect, the invention relates to an apparatus for forming a glass sheet which comprises a conveyor system having a deposition substrate, a deposition zone where soot is generated and deposited on the deposition substrate to form a preform, and a channel having a series of heated zones which become progressively cooler along a length of the channel.

Other features of the invention such as the physical orientation of the deposition substrate and/or the deposition zone, the transition angle of the preform through the transition zone as well as other advantages of the invention will be apparent from the following description and the appended claims.

DETAILED DESCRIPTION

Embodiments of the invention provide a method of forming a glass sheet, particularly a glass sheet having a high strain point. The glass sheet formed by the method of the invention has excellent flatness and surface quality that meet advanced display requirements, even without polishing and grinding. The method involves generating a preform and drawing (or attenuating) the preform into a glass sheet. The preform can be a soot preform or a glass preform. The term "soot preform" as used herein refers to a cohesive, semi-sintered mass of glass particles, typically less than 100 μm in size. The soot preform is porous, while the glass preform is dense. Preferably, the preform is not so porous that it cannot be drawn into a glass sheet. In one embodiment, the preform is made completely or substantially of amorphous silica, which may be doped with other chemical elements or oxides in order to ultimately yield flat sheets or panels of glass that are suitable for advanced displays.

The invention provides three approaches to forming a glass sheet, namely batch, semi-continuous, and continuous. These three approaches will now be described with reference to the accompanying drawings.

Batch Process

In accordance with one embodiment of the invention, the batch approach to forming a glass sheet involves (a) generating a preform in the general shape of a slab or thick sheet, e.g., at least 2 to 3 times thicker than the final glass sheet, and (b) drawing the preform into a glass sheet having desired dimensions, i.e., width and thickness, and flatness.

Figure 1:
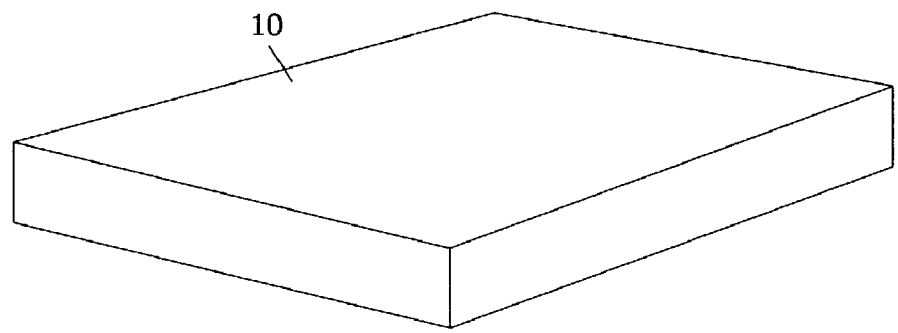
FIG. 1 shows a preform generated in the general shape of a slab.

FIG. 1 shows a preform 10 having the general shape of a slab. The composition of the preform 10 depends on the target application. For advanced displays, such as AMLCDs, the glass composition preferably has a high strain point, e.g., greater than 700° C., and preferably greater than 900° C. Glasses having high silica content, i.e., greater than 90 mol % silica and preferably greater than 95 mol % silica, have a strain point that is typically greater 900° C. The glass composition may also include dopant materials, such as F, Mg, Ca, Sr, Ba, B, Al, Y, La, Ti, and P. High silica glass has properties that make it attractive for making AMLCD substrates, i.e., high strain point (greater than 1000° C.), low density (2.2 g/cm$^3$), and low coefficient of thermal expansion ($5 \times 10^{-7}$° C.).

Figure 2:
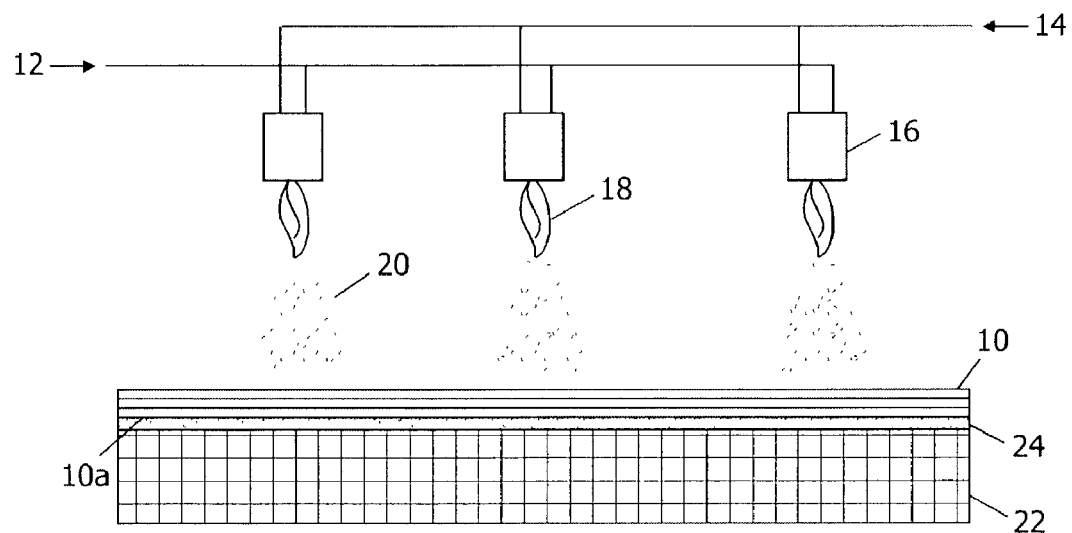
FIG. 2 illustrates a flame deposition process for forming a preform.

The preform 10 can be generated via flame deposition, plasma deposition, chemical vapor deposition, sol gel method, or other soot/glass deposition process, such as those used in producing high purity fused silica and optical waveguides. FIG. 2 illustrates a flame deposition process wherein fuel 12 and precursor 14 are delivered to burners 16. As an example, the precursor 14 could be a compound containing silicon, e.g., silicon tetrachloride, octametylcyclotetrasiloxane or other siloxane, etc. Oxides and/or other compounds, such as those containing F, Mg, Ca, Sr, Ba, B, Al, Y, La, Ti, and P, may also be delivered to the burners 16. The burners 16 burn the fuel 12 to produce flames 18. The precursor 14 passes through the flames 18 to form fine glass particles 20, typically referred to as "soot." The soot 20 is directed onto a refractory substrate 22 to form the preform 10.

The soot 20 is deposited on the substrate 22 until the preform 10 reaches a desired thickness. To allow for uniform thickness of the preform 10, the substrate 22 may be rotated and/or oscillated while the soot 20 is deposited. The preform 10 is of the soot kind, i.e., a porous mass of glass particles, if the soot 20 is captured on the substrate 22 at temperatures below the consolidation temperature of the glass composition. The preform 10 is of the glass kind, i.e., dense glass, if the soot 20 is captured on the substrate 22 at temperatures sufficient to consolidate the soot 20 directly into glass. For silica glass, these temperatures are typically well in excess of 1600° C. It should be noted that the thickness of the preform 10 may be limited by the density and porosity of the preform 10. The more tightly packed the soot 20, the thicker the preform 10 can be without disintegrating. Typically, the preform 10 is at least 2 to 3 times thicker than the final glass sheet to be formed.

After the preform 10 has reached a desired thickness, the deposition process is stopped, and the preform 10 is released from the substrate 22. To facilitate separation of the preform 10 from the substrate 22, the substrate 22 may be treated with a release agent 24, such as silica or graphite particles, prior to depositing the soot 20 on the substrate 22. After releasing the preform 10 from the substrate 22, it can be drawn into a glass sheet. It should be noted that the bottom surface 10a of the preform 10 will not be pristine, i.e., untouched, because it has been in contact with the substrate 22 and/or release agent 24. Display applications generally require glass substrates having pristine top and bottom surfaces. In one embodiment, after releasing the preform 10 from the substrate 22, the preform 10 is finished to remove surface irregularities and, possibly, inclusions. By way of example, the finishing process could involve grinding and/or thermal (or fire) polish of the preform 10.

Figure 3:
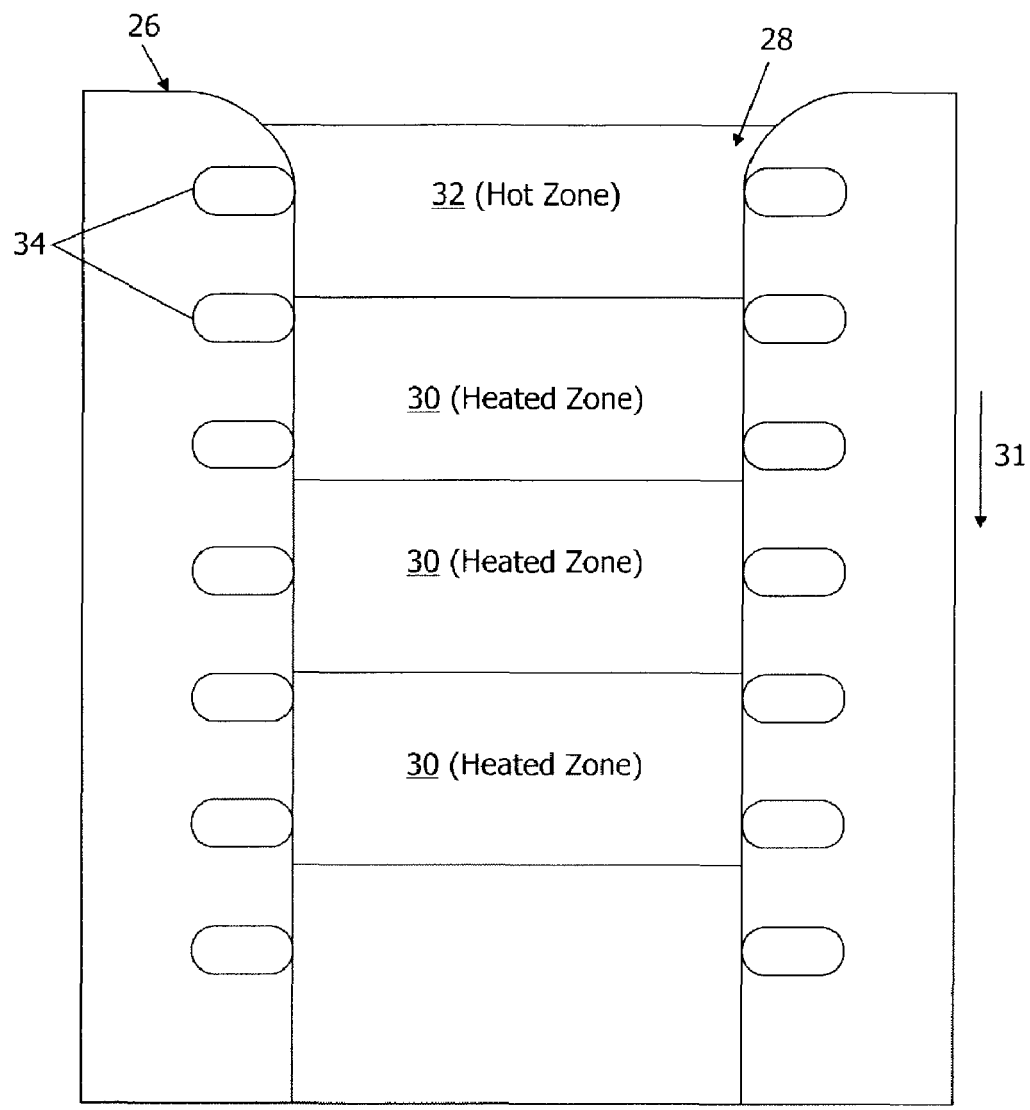
FIG. 3 shows a forming device for drawing a preform into a glass sheet.

If the preform 10 is of the glass kind, it can now be drawn directly into a glass sheet using the forming device 26 in FIG. 3 or other suitable "down-draw" or "updraw" device. If the preform 10 is of the soot kind, a consolidation step may be needed to substantially remove porosity from the preform 10 prior to drawing the preform into a glass sheet. The consolidation step may be needed because it is very difficult to draw (or attenuate) porous soot. It should be noted that the soot preform does not have to be fully consolidated prior to drawing it into a glass sheet. In one embodiment, the forming device (26 FIG. 3) includes a hot zone (32 FIG. 3) where porous soot can be consolidated into dense glass. If, for reasons dictated by the glass composition, product performance, or other factors, it is necessary to consolidate the preform 10 in a vacuum or controlled gas environment, the preform 10 may be consolidated offline and then subsequently attenuated using the forming device (26 FIG. 3).

FIG. 3 shows the forming device 26 for drawing soot or glass preform into a glass sheet. The forming device 26 includes a channel 28 for receiving the preform (not shown). The channel 28 is shown as vertical but could also have some other orientation, e.g., horizontal. A vertical channel is generally preferred because drawing is favored under vertical conditions due to the effect of gravity. The width of the channel 28 determines the width of the final glass sheet (not shown). Sets of rollers (or edge guides) 34 are positioned along the length of the channel 28 to convey the preform (not shown) through the channel 28 and to control (attenuate) the thickness of the preform (not shown). A series of heated zones 30 are defined inside the channel 28. The heated zones 30 become progressively cooler in the direction shown by the arrow 31. The zones 30 may be heated by electrical heating elements, induction heaters, or other heating means (not shown). A hot zone 32 may be optionally provided inside the vertical channel 28, above the heated zones 30. The hot zone 32 may be maintained at a temperature sufficient to consolidate porous soot into dense glass.

Figure 4A:
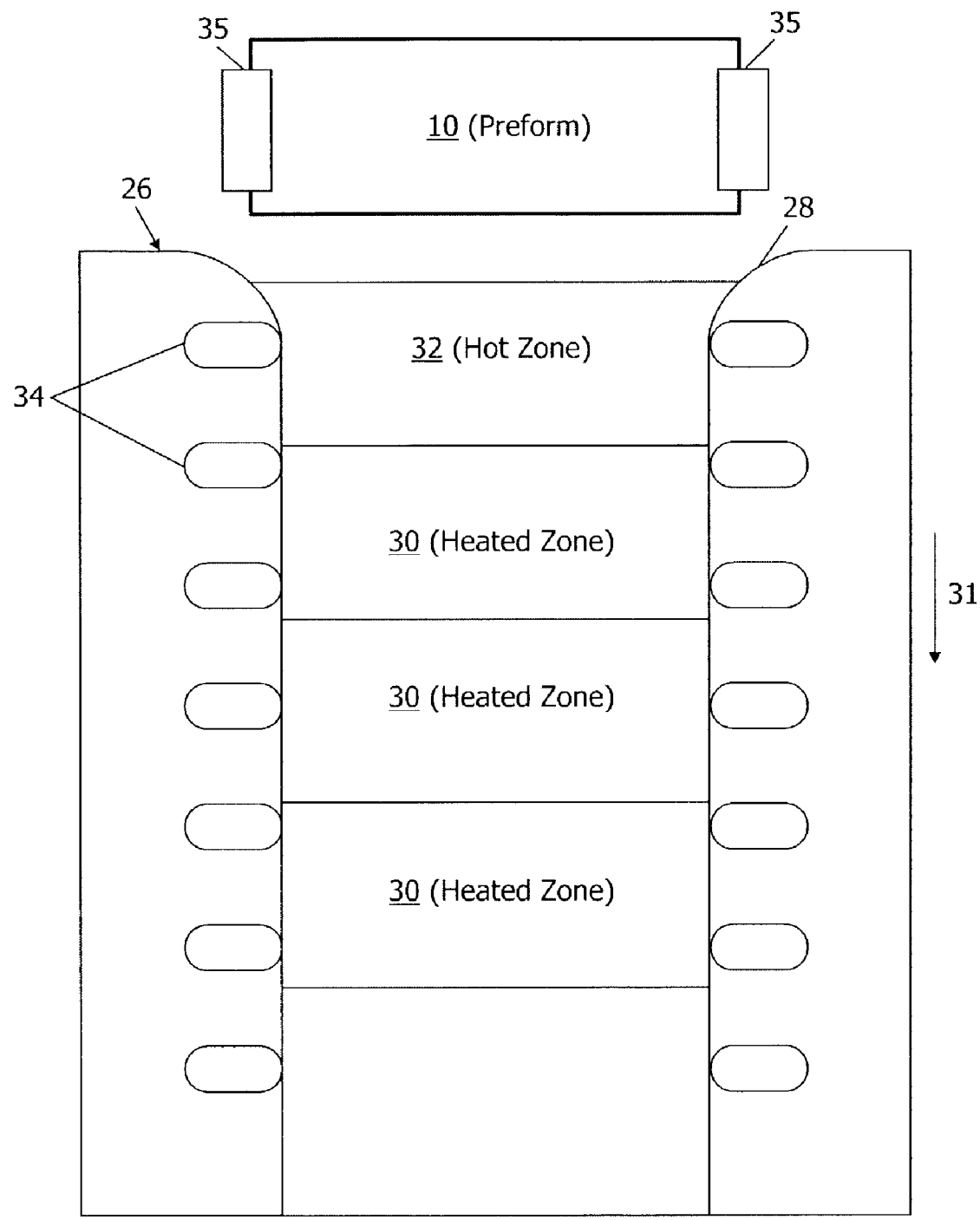
FIG. 4A shows a preform suspended vertically above the forming device of FIG. 3.

FIG. 4A shows the preform 10 suspended above the forming device 26. In the illustration, the vertical edges of the preform 10 are gripped by vertical rotating belts 35, situated above the forming device 26. The vertical rotating belts 35 can be operated to advance the preform 10 into the channel 28. The vertical rotating belts 35 are preferably made of a soft material, such as polymer or rubber, if the preform 10 is of the soot kind. The vertical rotating belts 35 can be made of a hard (or refractory) material, such as a metal, oxide, or graphite, if the preform 10 is of the glass kind. Other means for advancing the preform 10 into the channel 28 can also be used. In general, the advancing mechanism should not touch the useable region, i.e., the middle portion, of the preform 10 while the preform 10 is being advanced into the channel 28.

Figure 4B:
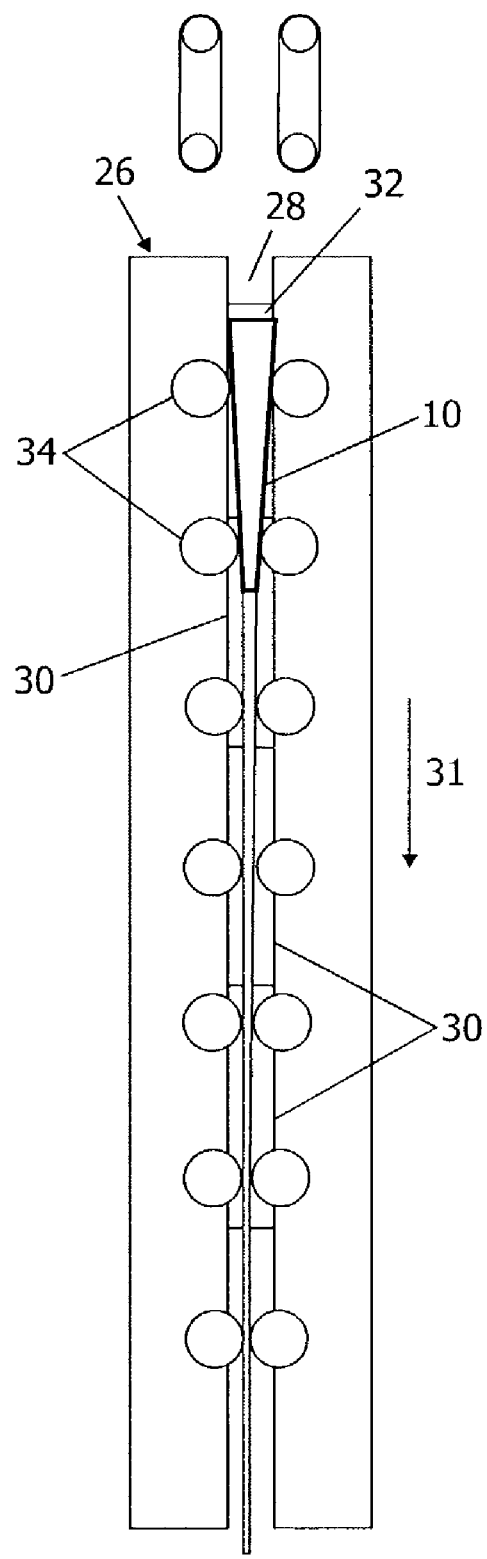
FIG. 4B shows the preform of FIG. 4A being drawn into a glass sheet.

FIG. 4B shows a vertical cross-section of the forming device 26. The preform 10 is now inside the channel 28. The paired rollers 34 gently grip (or press against) the vertical edges of the preform 10 and convey the preform 10 down the channel 28. The spacing between each of the paired rollers 34 is such that the thickness of the preform 10 is gradually reduced as the preform 10 is conveyed down the channel 28. If the preform 10 is a soot preform, it can be consolidated in the hot zone 32 into a dense glass that is essentially free of inclusion (gaseous or solid phase) prior to being conveyed through the heated zones 30. It should be noted that the preform 10 does not have to be fully consolidated prior to entering the heated zones 30. Also, the preform 10 may be further consolidated in one or all of the heated zones 30. If the preform 10 is a glass preform, consolidation in the hot zone 32 is not necessary.

Figure 4C:
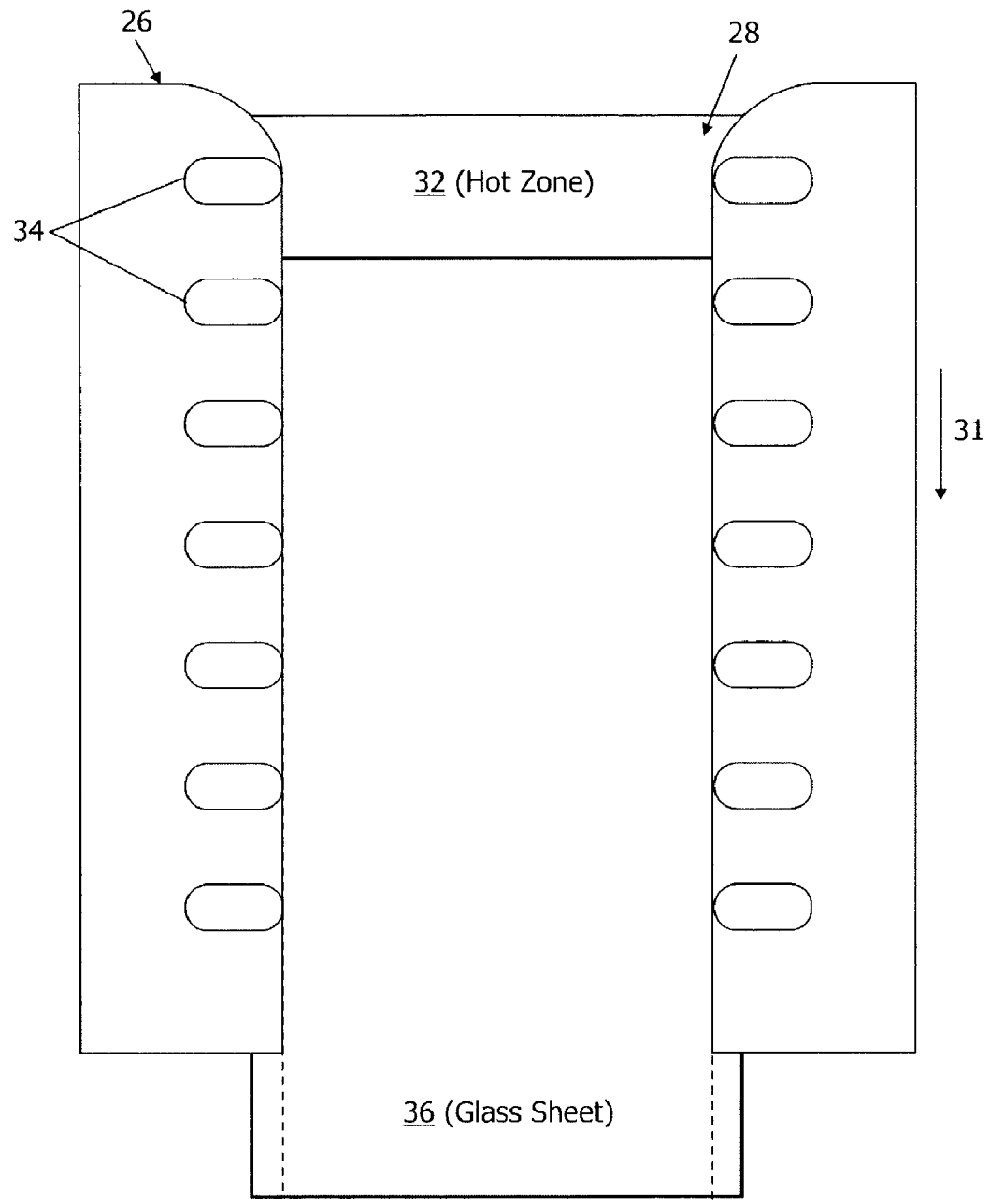
FIG. 4C shows the glass sheet formed from the preform shown in FIG. 4B.

As the preform 10 is conveyed through the cooler regions of the heated zones 30, it is formed into a very flat and uniform sheet of glass, which can ultimately no longer be deformed plastically because it has reached a high viscosity below its glass transformation temperature. FIG. 4C shows the glass sheet 36 coming out of the channel 28. The glass sheet 36 can be scored and cut as necessary. Typically, the vertical edges of the glass sheet 36, which has been in contact with the rollers 34, would have to be trimmed off because they are not pristine. Some finishing may also be needed if the useable region of the preform was not pristine prior to forming the glass sheet.

It was previously discussed that the preform may need to be finished prior to drawing it into a glass sheet. This is to ensure that both surfaces of the glass sheet formed from the preform are pristine. One way of getting around this finishing step is to combine two preforms into a single unit, with the non-pristine surfaces of the preforms in an opposing/mating relation. The non-pristine surfaces of the preforms are the surfaces in contact with the deposition substrate.

Figure 5:
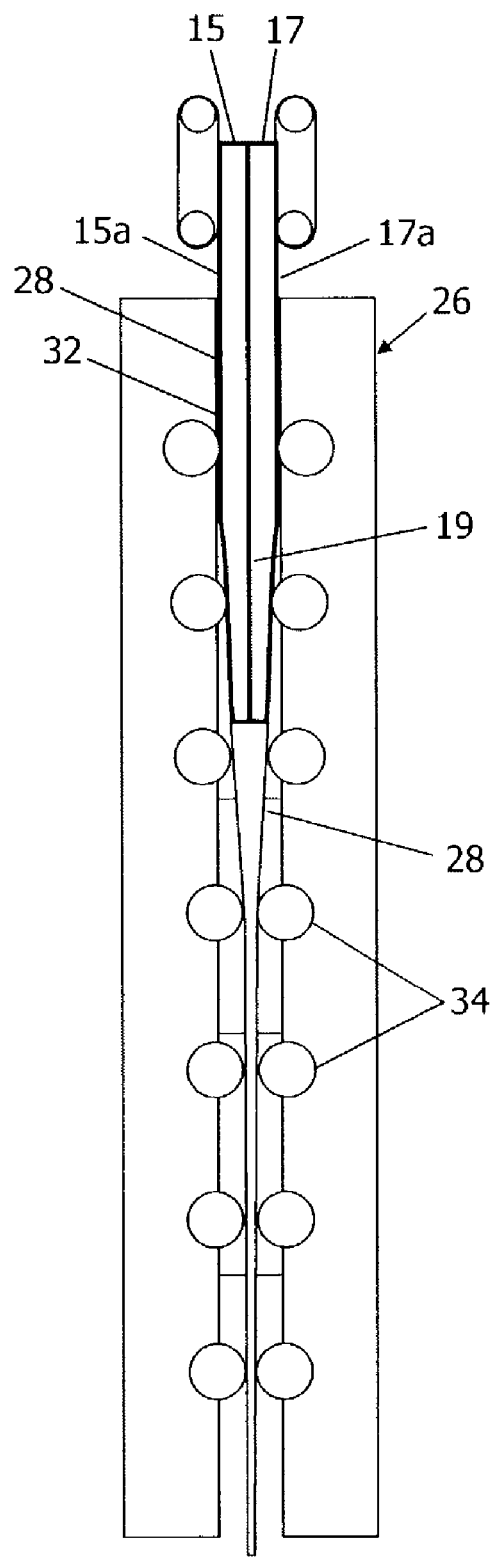
FIG. 5 shows a pair of preforms drawn simultaneously into a glass sheet.

FIG. 5 shows two preforms 15, 17 combined into a single unit. The outer surfaces 15a, 17a of the preforms are pristine. This single unit of preforms 15, 17 can now be drawn into a glass sheet using the forming device 26. The preforms 15, 17 are fed into the vertical channel 28 as a single unit. As they pass through the hot zone 32, the non-pristine surfaces of the preforms 15, 17 become fused together, as indicated at 19, and are buried within the bulk of the final sheet product. If desired, some minimal finishing can still be performed on the preforms 15, 17 prior to combining them into a single unit and drawing them into a glass sheet.

Semi-continuous Process

Figure 6A:
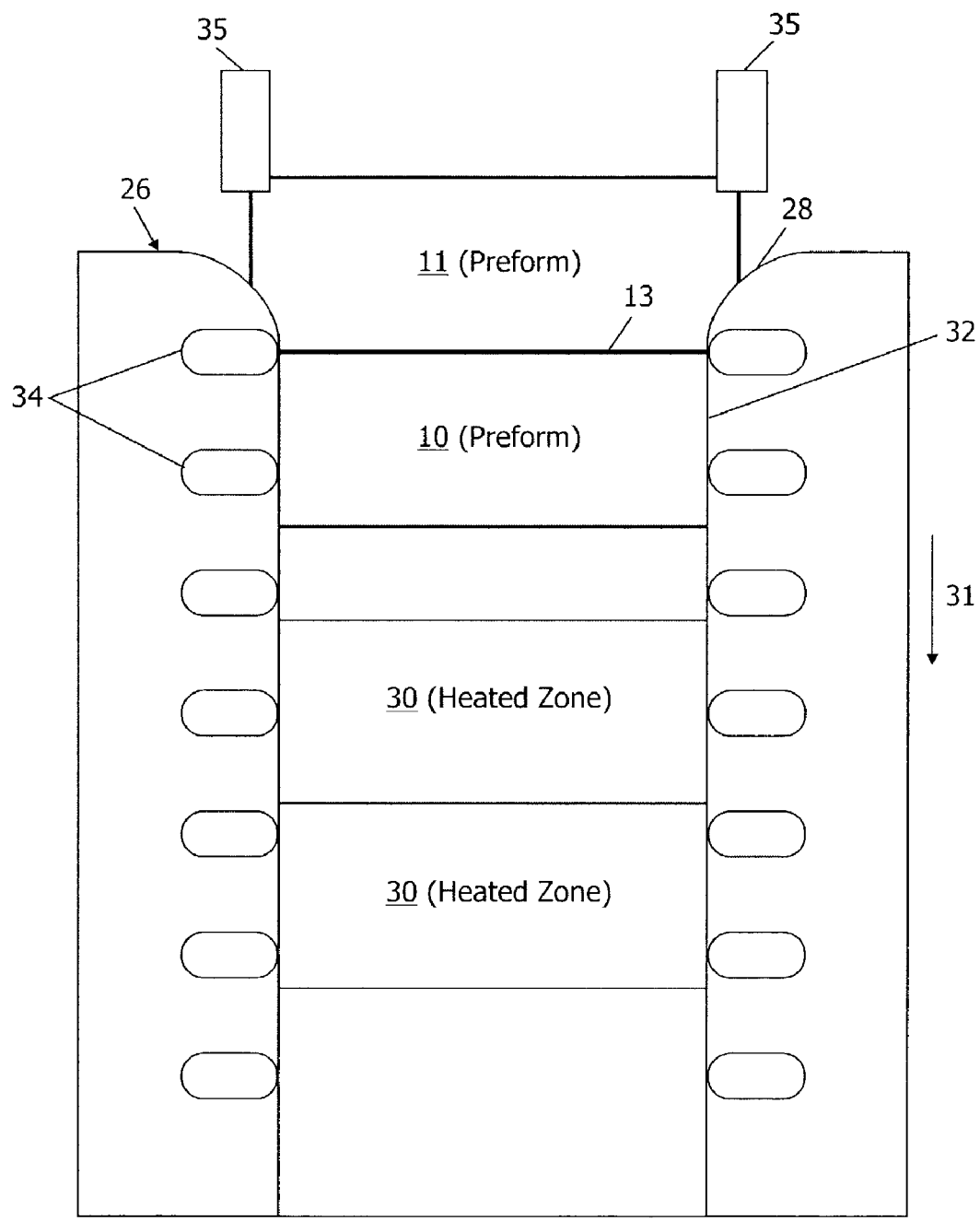
FIG. 6A shows preforms fed semi-continuously into the forming device.
Figure 6B:
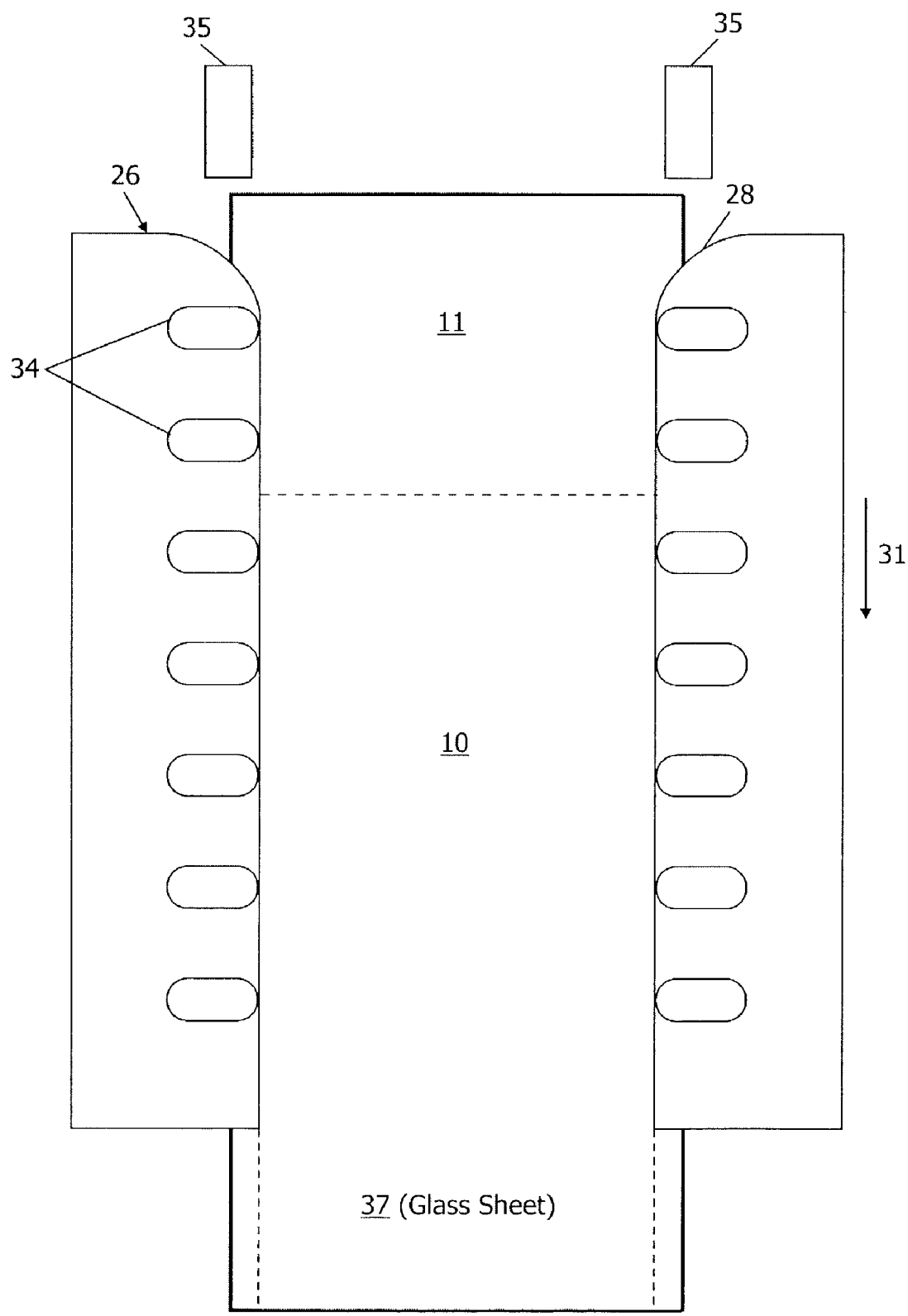
FIG. 6B shows a continuous glass sheet formed from linked preforms.

The semi-continuous process is similar to the batch process, except that soot or glass preforms are fed semi-continuously into the forming device 26 so that they become linked (or fused) on their edges as they pass through the hot zone 32. FIG. 6A shows adjacent edges of the preforms 10, 11 fused together in the hot zone 32. The fusion line between the preforms 10, 11 is indicated at 13. It should be noted that soot preforms can still be consolidated in the hot zone 32 as previously described. The linked preforms pass through the heated zones 30 as previously described to form a continuous glass sheet. FIG. 6B shows a continuous glass sheet 37 being formed from the linked preforms 10, 11. The glass sheet 37 can be scored and/or cut as it comes out of the forming device 26. Typically, the vertical edges of the glass sheet 37, which have been in contact with the rollers 34, would have to be trimmed off prior to using the glass sheet 37.

As previously discussed, the surfaces of the soot or glass preforms in contact with the deposition substrate are not pristine. In order to form a pristine sheet of glass, the soot or glass preforms may be finished prior to feeding them (in a semi-continuous manner) into the forming device 26. Alternatively, paired preforms having their non-pristine surfaces in mating/opposing relation can be fed into the forming device 26 in a semi-continuous manner. The paired preforms would be fused together inside the forming device 26, as previously described, so that their non-pristine surfaces become buried within the bulk of the final sheet product.

Figure 6C:
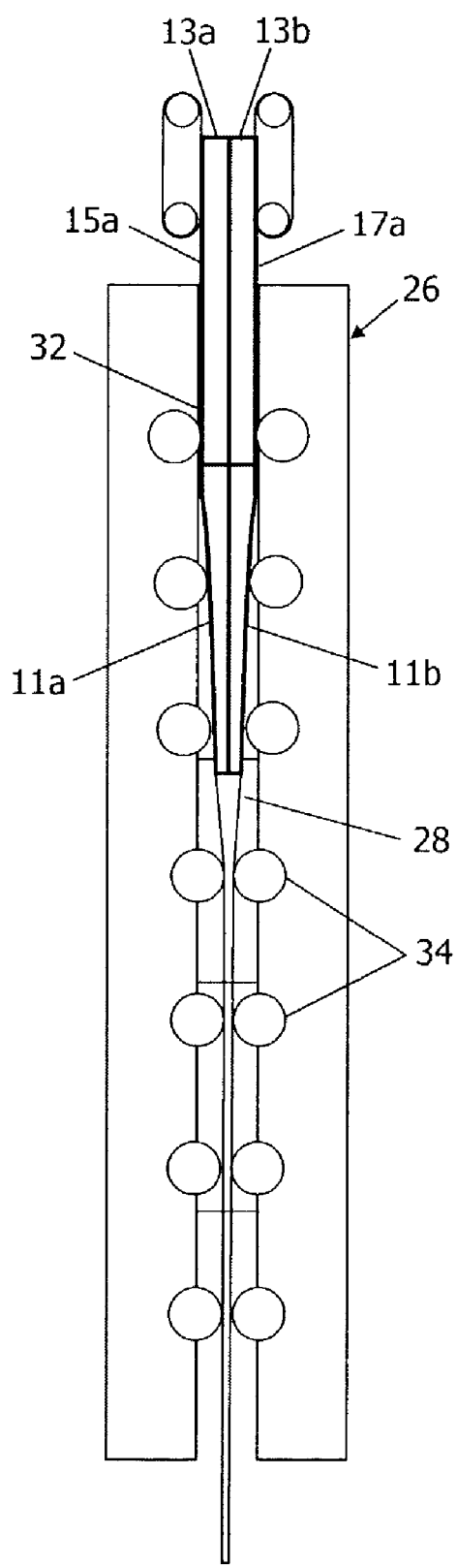
FIG. 6C shows paired preforms fed semi-continuously into the forming device.

FIG. 6C shows preforms 11a,11b having their non-pristine surfaces in mating/opposing relation fused together in the hot zone 32. Above the fused preforms 11a,11b are preforms 13a,13b, also having their non-pristine surfaces in mating/opposing relation. The preforms 13a,13b will be fused together and linked to the fused preforms 11a,11b in the hot zone 32. The linked preforms will be conveyed down the channel 28, as previously described, to form a continuous glass sheet.

Continuous Process

Figure 7A:
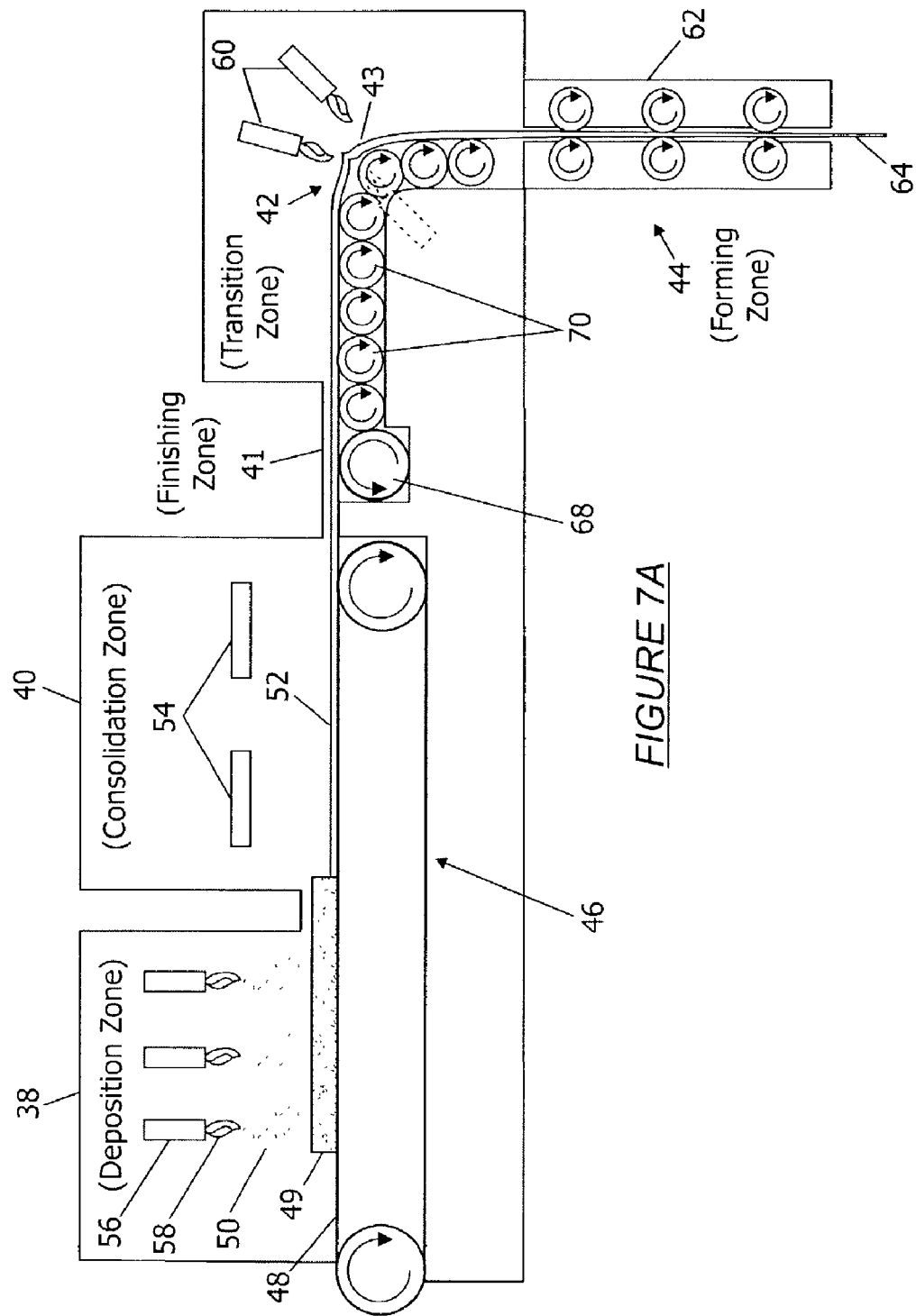
FIG. 7A shows a schematic of a continuous process for making a glass sheet.
Figure 7B:
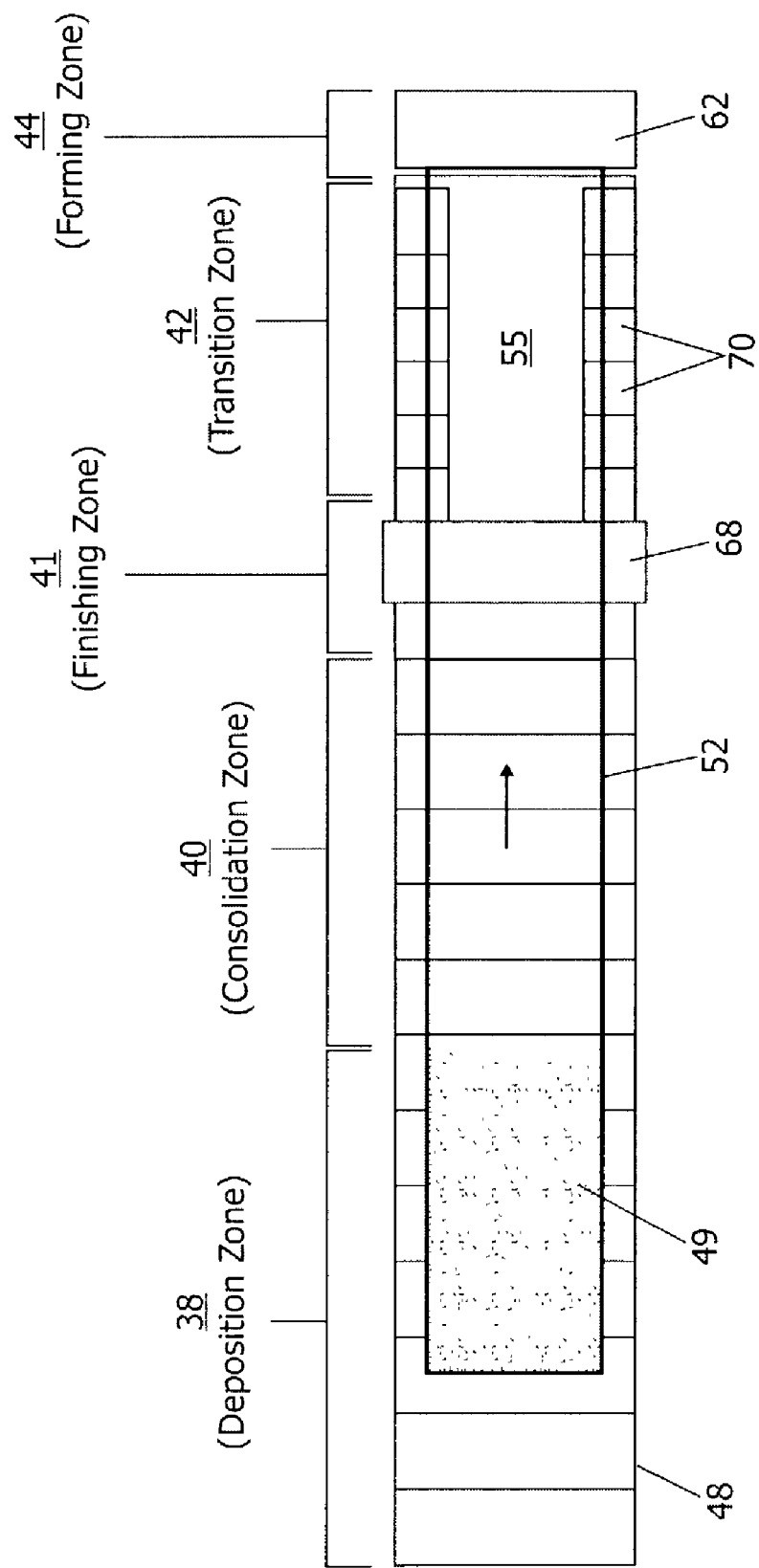
FIG. 7B shows a top view of the setup shown in FIG. 7A.

FIG. 7A shows a schematic of a continuous process for making a glass sheet in accordance with one embodiment of the invention. The process setup includes a deposition zone 38, a consolidation zone 40, a finishing zone 41, a transition zone 42, and a forming zone 44. A conveyor system 46, such as a wheel and track conveyor, cycles through the deposition zone 38 and the consolidation zone 40. The conveyor system 46 includes a refractory substrate 48, which may be segmented (see FIG. 7B) in order to allow for continuous return to the point of process origin. The substrate 48 is refractory in the sense that it is able to withstand high temperatures, e.g., in the excess of 1700° C., without significant deflection or distortion. The refractory substrate 48 could be made of graphite or alumina, for example. The composition of the refractory substrate 48 should be such that it does not adhere to hot glass. The substrate 48 may also be treated with a release agent, such as graphite particles, to allow for easy separation of hot glass from the substrate 48.

The continuous process involves generating soot 50 in the deposition zone 38. The deposition process is illustrated as a flame deposition process, but may also be a plasma deposition, chemical vapor deposition, or other soot/glass deposition process, such as those used in producing high purity fused silica and optical waveguides. The flame deposition process has been described above. In essence, fuel (not shown) and precursor (not shown) are delivered to burners 56. The burners 56 burn the fuel to produce flames 58, which convert the precursor into soot 50. The soot 50 is directed onto the moving substrate 48 to form the preform 49. The soot 50 may be captured on the substrate 48 at temperatures that are sufficiently high to consolidate the soot 50 directly into glass. Alternatively, the soot 50 may be captured at low temperatures and subsequently consolidated in the consolidation zone 40.

The consolidation zone 40 includes heating elements 54 which provide sufficient heat to consolidate porous soot into dense glass 52. Thus, in one embodiment, the soot 50 is continuously generated in the deposition zone 38 to form a continuous preform 49, and the preform 49 is consolidated into a continuous glass preform 52 in the consolidation zone 40. The glass preform 52 is much thicker than the final glass sheet to be formed, e.g., at least 2 to 3 times thicker than the final glass sheet to be formed. In the illustration, the consolidation zone 40 is shown right after the deposition zone 38. In other embodiments of the invention, as will be later described, the consolidation zone 40 may be located between the transition zone 42 and the forming zone 44 or in the forming zone 44. The consolidation zone 40 is optional if the preform 49 is of the soot kind.

At the end of the conveyor system 46, the substrate 48 returns to the point of process origin while the glass preform 52 separates from the substrate 48 and moves into the finishing zone 41. The purpose of the finishing zone 41 is to remove any surface irregularities from the bottom surface of the glass preform 52, which has been in contact with the refractory substrate 48. Any solid or gaseous inclusions may also be removed from the glass preform 52 in this zone. As an example, the finishing may include a rotating wheel 68 (or series of rotating wheels) that can clean up, i.e., flatten (or eliminate asperities from, the bottom surface of the glass preform 52. Preferably, the glass preform 52 is cooled to room temperature or near room temperature prior to finishing the glass preform 52 with the rotating wheel 68.

Figure 7C:
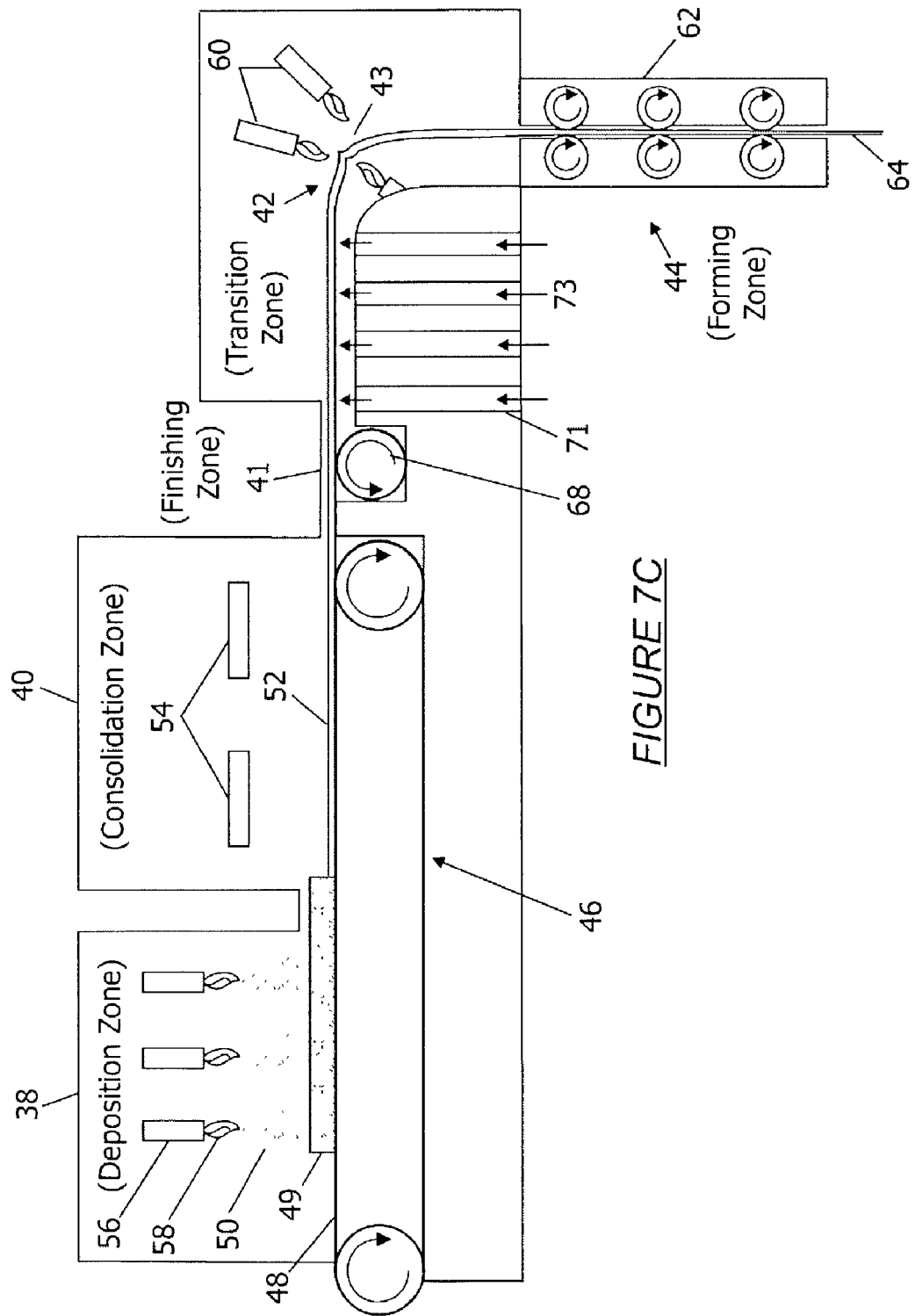
FIG. 7C shows a glass preform floated on a bed of air after a finishing process.

After the glass preform 52 is finished, it is conveyed into the transition zone 42 into the forming zone 44. Preferably, at least the useable region of the glass preform 52 (show at 55 in FIG. 7B) does not come into contact with any hard or refractory material after the glass preform 52 has been finished. Edge guides, e.g., a set of rollers 70, can be used to support the edges of the glass preform 52 such that the useable region of the glass preform 52 is free from contact. Alternatively, the glass preform 52 may be floated on a bed of air (or other gas). FIG. 7C shows channels 71 through which air (or gas) 73 can be introduced below the glass preform 52 to support the glass preform 52.

The transition zone 42 is a stage in the process where the glass preform 52 moves from a non-vertical orientation, i.e., the deposition plane, to a vertical orientation. Transition to the vertical orientation is desired because drawing is more favorably conducted under vertical conditions due to the effect of gravity. Typically, the non-vertical orientation is a substantially horizontal orientation because deposition processes are more favorably conducted under substantially horizontal conditions. However, this is not to imply that the deposition plane, i.e., the substrate 48, could not be inclined at an angle if desired.

The glass preform 52 is shown as bending at location 43 as it transitions (while still in the deposition plane) into the vertical orientation. This may not be a necessary aspect of the process, but clearly depends upon the downward forces acting on the glass preform 52 and the viscosity of the glass as it passes beyond the deposition plane. In the illustration, the transition angle of the glass preform 52 is about 90°. However, the invention is not limited to a transition angle of about 90°. The transition could be greater than 90°, perhaps even as great as 120°, depending upon the inclination of the deposition plane.

The transition zone 42 is impacted by the temperature and viscosity of the glass preform 52. Additional heat may be needed to allow the glass preform 52 to flow/bend at location 43. The figure shows burners 60 for providing additional heat to the glass preform 52. Other means of heating, such as electrical or induction heating elements may also be used to provide the necessary heat at location 43. If the glass preform 52 carries enough heat through the conveyed region of the process, then additional heating may not be necessary. It should also be noted that as the glass preform 52 transitions from the non-vertical orientation to the vertical orientation, it may become significantly attenuated, thereby generating additional surface from bulk material. Heat can be applied to the glass preform 52 at and beyond the location 43 to enable attenuation and a thermal polish of the additional surface.

The glass preform 52 is transitioned into the vertical orientation and fed into the forming device 62 in the forming zone 44. The forming device 62 is similar to the forming device 26 shown in FIG. 3. Also, the process for forming the continuous glass sheet 64 from the continuous glass preform 52 is similar to the process previously described.

Figure 8:
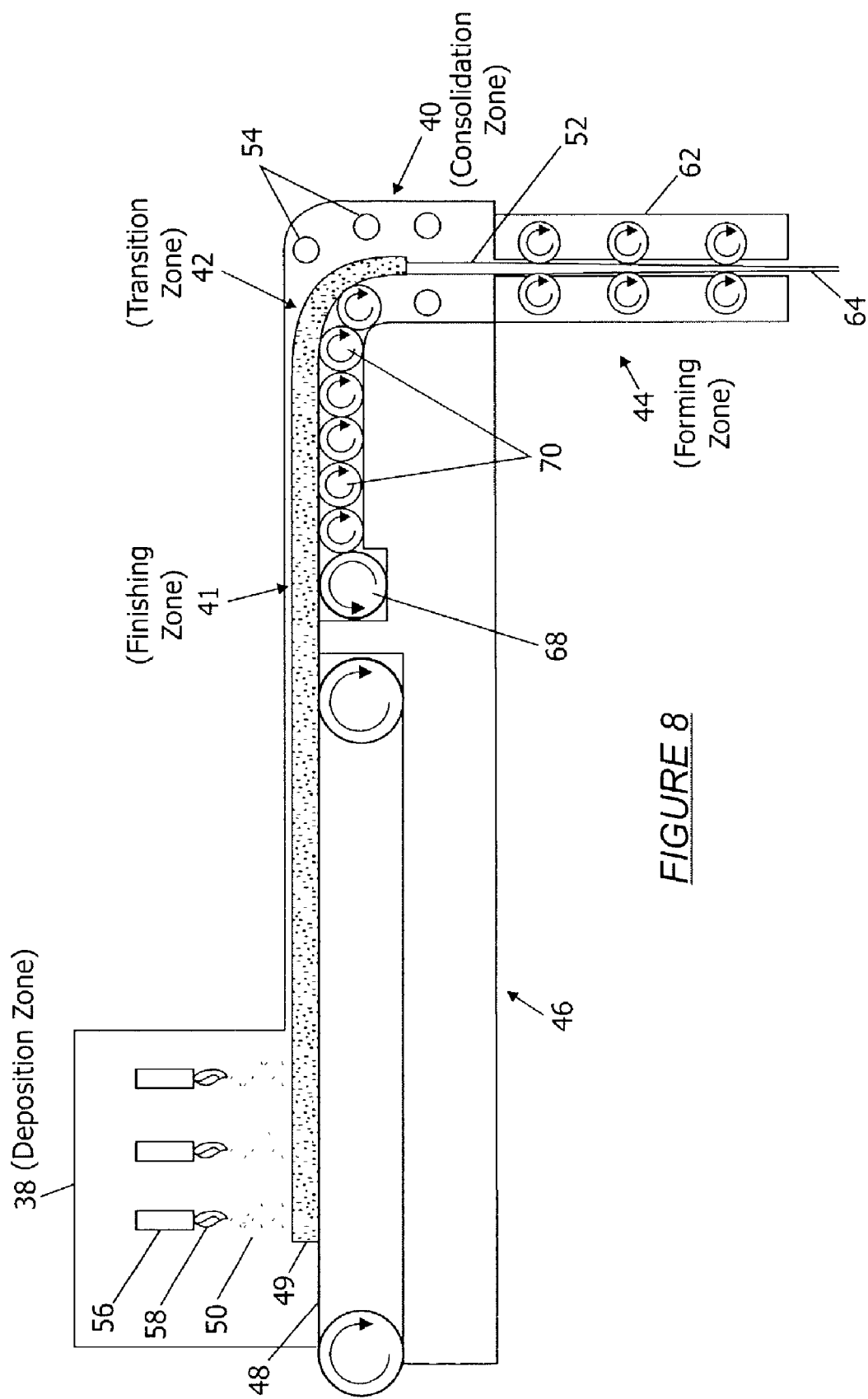
FIG. 8 shows a consolidation zone located between the transition and forming zones of FIG. 7.

Those skilled in the art will appreciate that various modifications can be made to the continuous process just described. For example, FIG. 8 shows an embodiment wherein the consolidation zone 40 is now located between the transition zone 42 and the forming zone 44 instead of between the deposition zone 38 and the transition zone 42. In this case, the preform 49 formed in the deposition zone 38 is conveyed to the transition zone 42, where it is transitioned into the consolidation zone 40. The consolidation zone 40 is vertical in the illustrated embodiment. The preform 49 should be relatively stiff so that it can be transitioned to the vertical orientation without disintegrating. Some partial consolidation (sintering) may be necessary during the deposition process. In the consolidation zone 40, the heating elements 54 provide the heat to consolidate the preform 49 into the glass preform 52. The glass preform 52 is then fed into the forming device 62 in the forming zone 44 to form the glass sheet 64.

Another modification that could be made is to eliminate the consolidation zone 40 altogether and consolidate the preform 49 in a hot zone in the forming device 62 prior to drawing the preform 49 into the final glass sheet.

Figure 9:
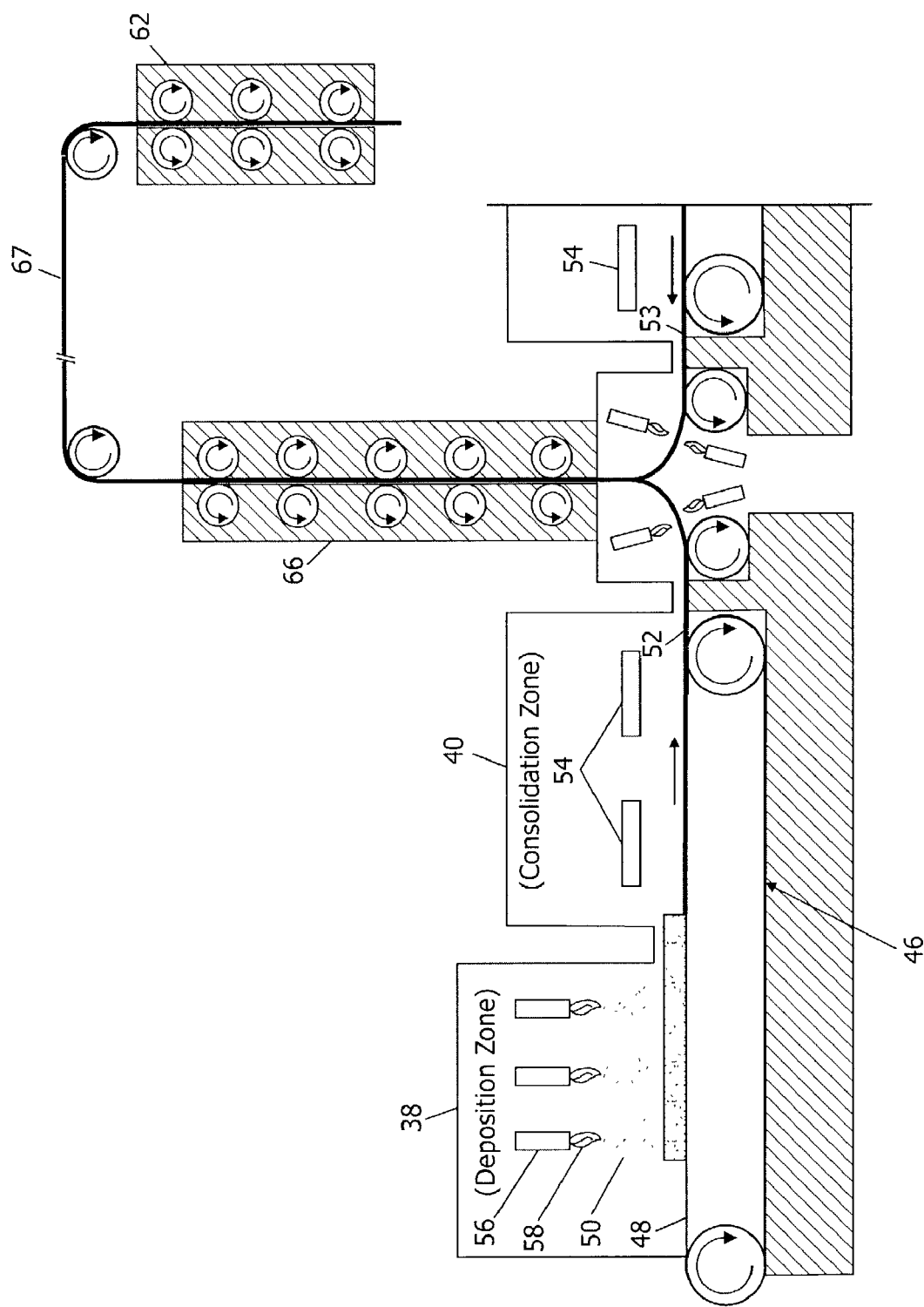
FIG. 9 shows a glass sheet formed from two continuous glass sheets.

FIG. 9 shows another embodiment of the invention wherein the bottom surfaces of two continuous glass preforms 52, 53 are brought together so that these surfaces, which are not completely pristine, or untouched, like the top surfaces are fused together and are buried within the bulk of the final sheet product 67. In the illustrated embodiment, the glass sheets 52, 53 are drawn upwardly through a forming device 66 to form the final glass sheet 67. However, it should be noted that it may not be possible to achieve the desired flatness in an up-draw process. If necessary, the forming device 62 can be used to down-draw the glass sheet 67 such that the desired flatness is attained. Many of the variations described above are also applicable to this embodiment. For example, continuous soot preforms (as opposed to continuous glass preforms) could be brought together and consolidated inside the forming device 66 prior to drawing them into the final glass sheet.

It should be noted that all processes take place in an atmosphere/enclosure where contamination of glass is minimized and, as needed, consolidation (densification or removal of gaseous inclusions) is facilitated through the use of gases such as He.

The invention provides one or more advantages. The invention provides a method for forming a glass sheet that has excellent flatness and surface quality. The method can be used to form glass sheets with high strain points. The invention does not require delivery of a stream of molten glass to a sheet forming device, hence eliminating the need for a relatively large high-temperature glass melter. Some of the embodiments of the invention incorporate a finishing step into the forming process so that a post-forming process is not necessary to achieve a glass sheet with pristine top and bottom surfaces. In some cases, non-pristine surfaces are buried in the bulk of the final sheet product, eliminating the need for a finishing step to achieve pristine surfaces.

While the invention has been described with respect to a limited number of embodiments, those skilled in the art, having benefit of this disclosure, will appreciate that other embodiments can be devised which do not depart from the scope of the invention as disclosed herein. The scope of the invention is defined by the attached claims.

What is claimed is:

1. A method of forming a glass sheet having a predetermined thickness and width, comprising:
    delivering into a forming device a preform generated from a glass composition, the preform having a thickness greater than the predetermined thickness of the glass sheet, wherein the preform is a porous mass of glass particles;
    drawing the preform that is a porous mass of glass particles into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform; and
    consolidating the preform prior to drawing the preform.

2. A method of forming a glass sheet having a predetermined thickness and width, comprising:
A method of forming a glass sheet having a predetermined thickness and width, comprising:
    delivering into a forming device a preform generated from a glass composition, the preform having a thickness greater than the predetermined thickness of the glass sheet, wherein the preform is a porous mass of glass particles;
    drawing the preform that is a porous mass of glass particles into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform; and
    consolidating the preform in a hot zone in the channel.

3. A method of forming a glass sheet having a predetermined thickness and width, comprising:
    delivering into a forming device a preform generated from a glass composition, the preform having a thickness greater than the predetermined thickness of the glass sheet, wherein the perform is a porous mass of glass particles or a dense consolidated glass and
    drawing the preform that is a porous mass of glass particles or a dense consolidated glass into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform;
    wherein delivering the preform is preceded by generating the preform in the form of a slab and comprises transitioning the preform from a deposition plane in which the preform is generated to a vertical plane in which the preform is drawn into the glass sheet.

4. The method of claim 3, further comprising finishing the preform to remove surface irregularities prior to drawing the preform.

5. A method of forming a glass sheet having a predetermined thickness and width, comprising:
    delivering into a forming device a preform generated from a glass composition, the preform having a thickness greater than the predetermined thickness of the glass sheet, wherein the perform is a porous mass of glass particles or a dense consolidated glass;

drawing the preform that is a porous mass of glass particles or a dense consolidated glass into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform; and finishing the preform to remove surface irregularities prior to drawing the preform.

6. A method of forming a glass sheet having a predetermined thickness and width, comprising:

delivering into a forming device a preform generated from a glass composition, the preform having a thickness greater than the predetermined thickness of the glass sheet, wherein the perform is a porous mass of glass particles or a dense consolidated glass; and drawing the preform that is a porous mass of glass particles or a dense consolidated glass into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform;

wherein delivering the preform is preceded by generating the preform from the glass composition as a continuous preform and wherein generating the preform from the glass composition comprises generating soot and depositing the soot on a deposition substrate.

7. The method of claim 6, wherein depositing the soot comprises consolidating the soot directly into dense glass.

8. The method of claim 6, further comprising consolidating the soot into dense glass.

9. The method of claim 6, further comprising removing asperities from a surface of the preform in contact with the deposition substrate.

10. A method of forming a glass sheet having a predetermined thickness and width, comprising:

delivering into a forming device a preform generated from a glass composition, the preform having a thickness greater than the predetermined thickness of the glass sheet, wherein the perform is a porous mass of glass particles or a dense consolidated glass; and drawing the preform that is a porous mass of glass particles or a dense consolidated glass into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform;

wherein delivering the preform is preceded by generating the preform from the glass composition as a continuous preform and comprises transitioning the preform from a non-vertical orientation to a vertical orientation prior to conveying the preform through the channel.

11. The method of claim 10, further comprising locally heating the preform to decrease a viscosity of the preform at a point at which the preform transitions from the non-vertical orientation to the vertical orientation.

12. A method of forming a glass sheet having a predetermined thickness and width, comprising:

delivering into a forming device a preform generated from a glass composition, the preform having a thickness greater than the predetermined thickness of the glass sheet, wherein the perform is a porous mass of glass particles or a dense consolidated glass;

and drawing the preform that is a porous mass of glass particles or a dense consolidated glass into the glass sheet having the predetermined thickness and width, said drawing comprising conveying the preform through a channel of the forming device having the predetermined width, a temperature that decreases along a length of the channel, and a series of rollers positioned along the length of the channel, said series of rollers configured to convey the preform through the channel while attenuating the thickness of the preform;

wherein delivering the preform is preceded by generating the preform from the glass composition as a continuous preform and wherein generating the preform comprises generating soot and depositing the soot on a moving deposition substrate to form the continuous preform.

13. The method of claim 12, further comprising consolidating the preform, wherein consolidating the preform occurs simultaneously with depositing soot on the moving deposition substrate.

14. The method of claim 12, further comprising removing asperities from at least a surface of the preform in contact with the deposition substrate prior to drawing the consolidated preform into a glass sheet.

15. The method of claim 12, further comprising transitioning the preform from a non-vertical orientation to a vertical orientation prior to conveying the preform through the channel.

* * * * *